US012359437B2

(12) United States Patent
Rodet

(10) Patent No.: US 12,359,437 B2
(45) Date of Patent: Jul. 15, 2025

(54) METHOD AND DEVICE FOR ATTACHING A METAL MESH SCREEN TO A BUILDING

(71) Applicant: COMPTOIR DES MAILLES ET DE L'ARCHITECTURE, La Roqued'Anthéron (FR)

(72) Inventor: Nicolas Rodet, La Roque d'Anthéron (FR)

(73) Assignee: COMPTOIR DES MAILLES ET DE L'ARCHITECTURE, La Roqued'Anthéron (FR)

( * ) Notice: Subject to any disclaimer, the term of this patent is extended or adjusted under 35 U.S.C. 154(b) by 199 days.

(21) Appl. No.: 17/998,529

(22) PCT Filed: May 12, 2021

(86) PCT No.: PCT/FR2021/050831
§ 371 (c)(1),
(2) Date: Nov. 11, 2022

(87) PCT Pub. No.: WO2021/229187
PCT Pub. Date: Nov. 18, 2021

(65) Prior Publication Data
US 2023/0203819 A1    Jun. 29, 2023

(30) Foreign Application Priority Data
May 13, 2020   (FR) ...................................... 2004726

(51) Int. Cl.
*E04F 10/00*       (2006.01)
*B60J 7/10*        (2006.01)
(Continued)

(52) U.S. Cl.
CPC ............ *E04F 10/00* (2013.01); *E04F 13/005* (2013.01); *B60J 7/104* (2013.01); *F16B 7/06* (2013.01); *F16G 11/12* (2013.01); *G09F 15/0025* (2013.01)

(58) Field of Classification Search
CPC .... E04F 10/00; E04F 13/005; G09F 15/0025; F16G 11/12; F16B 7/06; B60J 7/104
See application file for complete search history.

(56) References Cited

U.S. PATENT DOCUMENTS 2,227,609 A * 1/1941 Troman .................. F16G 11/12
                                                    267/71
2,931,436 A   4/1960 Parrish
(Continued)

FOREIGN PATENT DOCUMENTS

DE    102014016999 A1    5/2016
FR         1428959 A     2/1966
WO       2017046721 A1   3/2017

OTHER PUBLICATIONS

International Preliminary Report on Patentability with English translation of the Written Opinion of the International Searching Authority mailed Nov. 24, 2022, in connection with International Application No. PCT/FR2021/050831, 7 pages.
(Continued)

*Primary Examiner* — Omar F Hijaz

(57) ABSTRACT

The invention relates to a method of attaching a wire mesh sunshield screen to a building in which the screen is connected to the building by at least one traction element (119, 120, 121) and the screen is tensioned by exerting a traction on the traction element. The traction on the traction element is provided by a compression spring (30) and the intensity of the traction on the traction element is evaluated by an evaluation device (500, 501, 1550) comprising an opaque mask (1550) and a movable visual indicator (500, 501)
(Continued)

which is movable relative to the opaque mask (550) as a function of the compression of the spring (30).

14 Claims, 5 Drawing Sheets

(51) Int. Cl.
    *E04F 13/00*     (2006.01)
    *F16B 7/06*     (2006.01)
    *F16G 11/12*     (2006.01)
    *G09F 15/00*     (2006.01)

(56) References Cited

U.S. PATENT DOCUMENTS

| | | | | |
|---|---|---|---|---|
| 3,465,764 | A * | 9/1969 | Huddle | E04H 15/18 |
| | | | | 135/120.1 |
| 3,751,083 | A * | 8/1973 | Jacobson | F16B 7/06 |
| | | | | 403/46 |
| 8,251,121 | B1 * | 8/2012 | Casey | E04F 10/02 |
| | | | | 160/368.1 |
| 2003/0150171 | A1 * | 8/2003 | Kunzel | E04B 7/14 |
| | | | | 52/63 |
| 2014/0069052 | A1 * | 3/2014 | Precht | E04F 13/07 |
| | | | | 52/800.1 |

OTHER PUBLICATIONS

International Search Report and Written Opinion of the International Searching Authority dated Sep. 3, 2021, in connection with International Application No. PCT/FR2021/050831, 15 pages.

* cited by examiner

METHOD AND DEVICE FOR ATTACHING A METAL MESH SCREEN TO A BUILDING

CROSS-REFERENCE TO RELATED APPLICATIONS

This application is a 371 National Stage of International Application No. PCT/FR2021/050831, filed May 12, 2021, which claims priority to French Patent Application No. FR2004726, filed May 13, 2020, the disclosures of which are herein incorporated by reference in their entirety.

BACKGROUND

1. Field

The present invention relates to systems for attaching a metal mesh screen to a building.

The invention applies in particular to a system for attaching a metal sunscreen to a building façade.

2. Description of Related Art

Patent EP1809831 describes a panel with a metal mesh for mounting on the exterior of a building to shade windows while allowing light to pass through. The panel comprises a metal mesh made of weft elements formed by rods and warp elements formed by two cables passing above and below the weft elements. The panel has two plates to which the mesh is glued and one of which has pins that rest on the other plate. The panel can be suspended from the building by suspension elements attached to one of the plates.

Such shading structures, which often extend along a plane, away from a building façade, may have a large surface area, for example several tens or hundreds of square meters. These structures may be subjected to significant stresses resulting from the effects of wind on the structure, despite the openwork nature of a mesh structure. This can result in plastic deformation or destruction of the structure.

An objective of the invention is to provide a method and device for securing a metal mesh structure to a building, which is improved and/or remedies, at least in part, the deficiencies or drawbacks of known systems for securing such structures.

US20140069052A1 describes a sunshade formed by a structure supporting an interlacing of metal sheets. The ends of the sheets are provided with reinforcing plates to which a hook is attached. The hook is attached to a stud that is anchored to the wall of a building. The stud is surrounded by a spring that provides tension to the metal sheets by tightening a nut screwed onto the stud.

DE102014016999A1 describes an architectural film clamped between two clamping profiles. Surfaces are elastically clamped by means of a compression spring or a tension spring via fixed, spaced L-shaped holding rails. The springs serve to pre-tension the surface so that it does not vibrate too much with every little gust of wind.

WO 2017/046721 describes a cover system comprising at least one cover sheet, an installation and support structure. The installation and support structure includes elastic means for supporting and tensioning the sheet in at least one tensioning direction. The elastic means have at least one pair of torsion springs for supporting and tensioning the sheet, each torsion spring has a central spiral-shaped body from which extends a first leg, designed to be placed in abutment on a support surface of the system, and a second leg, having a hook-shaped end for the torsion spring.

SUMMARY

In particular, it is an objective of the invention to provide a method and device for attaching a wire mesh sunscreen to a building, which allows for easy and accurate adjustment of the intensity of the tension exerted on the wire mesh sunscreen.

This objective is achieved by providing a method for attaching a metal mesh sunshield screen to a building, comprising the steps of: connecting the screen to the building by at least one traction element connected to at least one edge of the screen; tensioning the screen by exerting a traction on the traction element, the traction on the traction element being provided by an elastically deformable compression spring which is compression loaded, along a traction axis on the traction element, by a screen tensioning element, the method comprising a step of evaluating the intensity of the traction exerted on the traction element by means of an evaluation device comprising an opaque mask and a movable visual indicator which is integral with or linked to the spring and is movable relative to the opaque mask as a function of the compression of the spring.

According to an embodiment, the movable visual indicator comprises a witness or colored part.

According to an embodiment, the spring rests on the movable visual indicator.

According to an embodiment, the intensities of the traction on the traction element are monitored remotely from the screen by visual control of the movable visual indicator.

According to an embodiment, the method comprises the steps of: connecting the screen to the building by a plurality of traction elements spaced along at least one edge of the screen, tensioning the screen by exerting traction on each of the traction elements, exerting traction on each traction element as mentioned above, and evaluating the intensities of the traction exerted on each traction element as mentioned above.

According to an embodiment, the traction elements are arranged evenly spaced along an edge of the screen, and the traction elements are acted upon with substantially equal traction intensities.

The present invention also relates to a device for attaching a metal mesh screen to a building, comprising at least one traction element configured to be arranged along at least one edge of the screen, to connect the screen to the building; a screen tensioning element for exerting traction on the traction element; and an elastically deformable compression spring which is compression loaded by the screen tensioning element to exert a traction on the traction element, wherein the device comprises a device for evaluating the intensity of the traction exerted on the traction element, including an opaque mask and a movable visual indicator that is integral with or linked to the spring and is movable with respect to the opaque mask as a function of the compression of the spring.

According to an embodiment, the movable visual indicator comprises a colored indicator or witness.

According to an embodiment, the spring rests on the movable visual indicator.

According to an embodiment, the movable visual indicator and the opaque mask surround or envelop the spring.

According to an embodiment, the traction element passes through the opaque mask and the moving visual indicator.

According to an embodiment, the traction element comprises a threaded stem and the tensioning element comprises a nut that is screwed onto the threaded stem.

According to an embodiment, the stiffness of the spring is in a range from about ten thousand newtons per meter up to about one hundred thousand newtons per meter.

The present invention also relates to a device for evaluating the intensity of traction exerted by a compression spring on a traction element of a device for attaching a metal mesh screen to a building, comprising an opaque mask and a movable visual indicator that is movable relative to the opaque mask in accordance with the compression of the spring.

The present invention also relates to a method of constructing a building provided with a metal mesh sunscreen, wherein the screen is attached to the building according to the above method or using the above device.

BRIEF DESCRIPTION OF THE DRAWINGS

These and other aspects, features, and advantages of the present invention will be better understood upon reading the following non-limiting description of embodiments of the method and devices according to the invention, with reference to the appended drawings among which.

DETAILED DESCRIPTION

Unless explicitly or implicitly stated otherwise, structurally or functionally identical or similar elements or components are designated by identical reference signs in the various figures.

Figure 1:
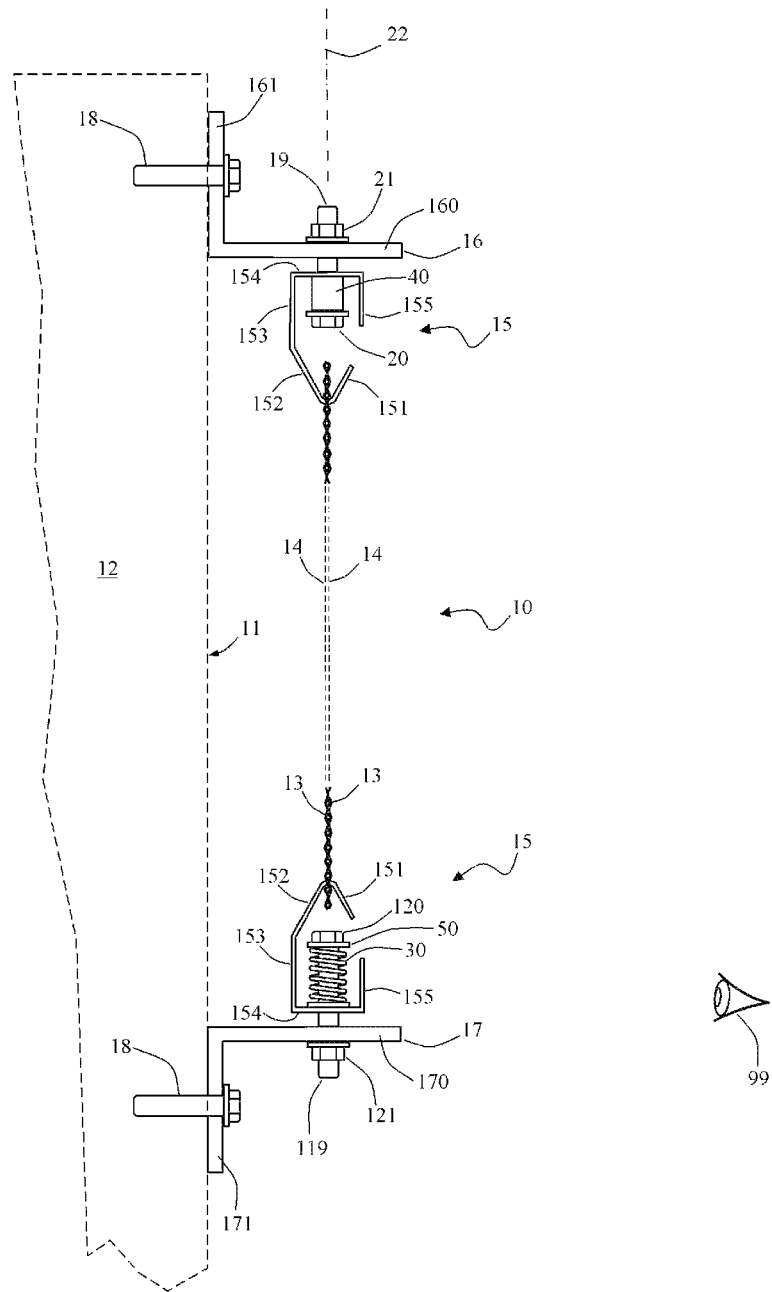
FIG. 1 schematically illustrates, through a side view, a metal mesh screen attached to a building facade according to an implementation of the method of the invention, FIG. 2 schematically illustrates, through a side view, the screen of FIG. 1 after correct tensioning.
Figure 2:
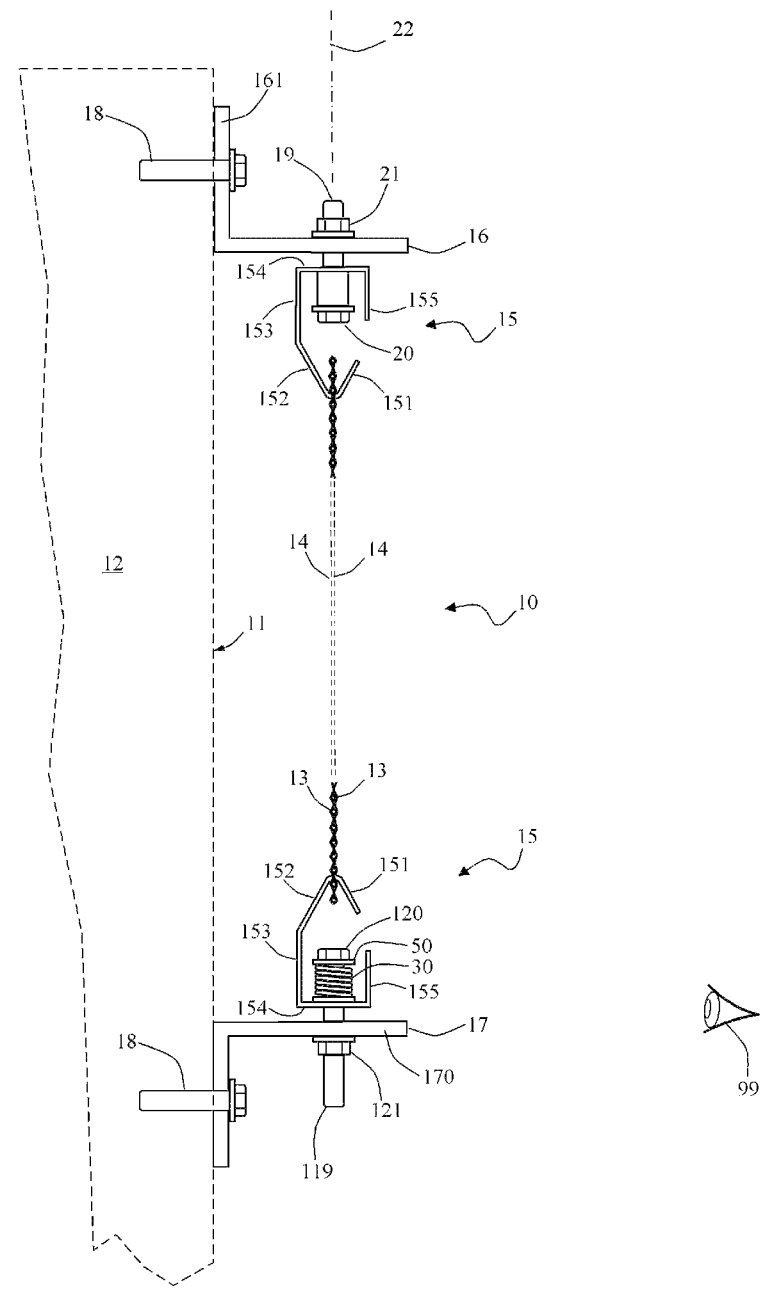

With reference to FIGS. 1 and 2 in particular, a screen 10 is attached to the façade 11 of a building 12, at a distance from—and substantially parallel to—the façade 11.

The screen may, for example, comprise a mesh made from stainless steel cables or wires, in particular from horizontally extending weft wires or cables 13, which are perpendicular to the plane of FIGS. 1 and 2, and vertically extending warp wires or cables 14, which are parallel to the plane of FIGS. 1 and 2.

The screen 10 is attached to the building 12 by means of two brackets 16, 17 that have a right-angled cross section, of which a respective flange 161, 171 is in contact with the facade 11, each flange 161, 171 having holes through which fixing screws 18 are sealed in the facade wall of the building.

The second flange 160 of the top bracket 16 supports the screen 10 via an upper holding bar 15, which bar 15 is suspended from the bracket 16 by a suspension device including a bolt having a screw 19, 20 and a nut 21.

Figure 3:
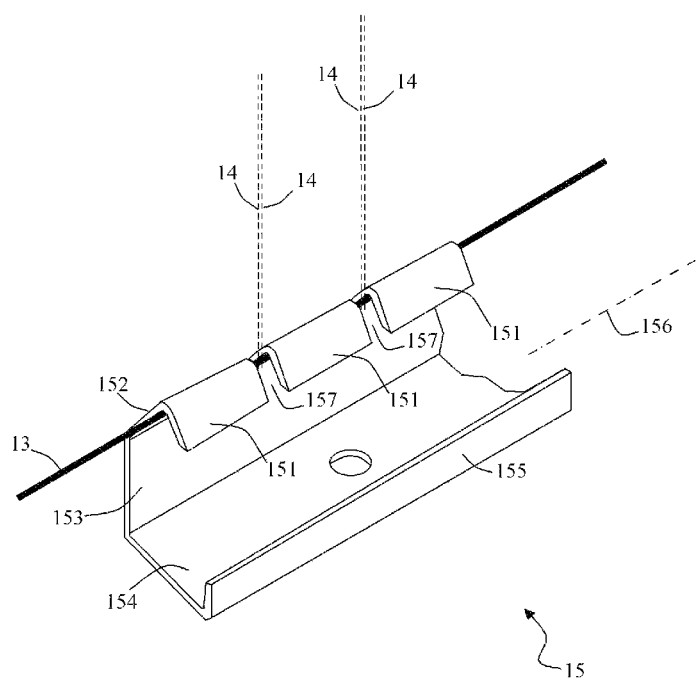
FIG. 3 illustrates a perspective view of an element of an attachment device shown in FIGS. 1 and 2, FIG. 4 schematically shows, through a sheared side view, a module attaching a screen to a building according to another implementation of the method of the invention.

With reference to FIGS. 1 to 3, the bar 15 has a profile shape with a longitudinal axis 156 and has five substantially planar wings 151 to 155 that extend respectively along five planes parallel to the axis 156, and are angled mutually two by two. The bar 15 may, for example, be obtained by four folding operations on a sheet metal strip, the four folds being parallel to the axis 156.

Cuts or notches 157 are provided in the wing 151, evenly spaced along the axis 156, so that each wing portion 151 extending between two adjacent notches 157 forms (with the wing 152) a hook for hooking the screen 10 to the bar 15.

For this purpose, a weft element (wire or cable) 13 of the screen is engaged in the angle formed by the two adjacent wings 151, 152, while the warp elements (wire or cable) 14 of the screen pass through the notches 157.

The other three planar wings 153 to 155 of the bar 15 form a U-shaped profile.

The threaded stem 19 of the screw 19, 20 extends through a hole drilled in the flange 160 of the upper bracket 16, as well as through a hole drilled in the wing 154 of the upper holding bar 15, along a vertical axis 22.

The nut 21 of the screen suspension bolt 19 to 21 rests on the upper side of the flange 160 of the bracket 16, via a washer.

The top edge of the screen 10 is thus suspended from the bar 15 that is in turn suspended from the bracket 16.

In a same or similar manner, the lower edge of the screen 10 is hooked to a lower holding bar 15 which is attached to the lower bracket 17 by an attaching and tensioning device including a bolt with a screw (or tie rod) 119, 120 and a nut 121.

For this purpose, the threaded stem 119 of the screw 119, 120 extends through an opening in the flange 170 of the bracket 17, as well as through an opening in the wing 154 of the lower bar 15, substantially along the vertical axis 22.

A plurality of tensioning screws 119, 120 are provided, which are evenly spaced along the lower holding bar 15 (and along the lower edge of the screen 10).

Similarly, in particular with the same spacing pitch, several suspension screws 19, 20 are provided, which are arranged evenly spaced along the upper holding bar 15 (and along the upper edge of the screen 10).

A nut 21, 121 is respectively screwed to each screw 19, 20, 119, 120 (to form a corresponding number of bolts).

A helical spring 30 is provided around the stem 119 and extends between the head 120 of the screw 119, 120 and the wing 154 of the lower bar 15.

Each screen tensioning nut 121 serves to exert a downward force along the axis 22 on the tensioning screw 119, 120.

To increase the tension in the screen, the nut 121, which rests (via a washer) under the flange 170 of the bracket 17, is screwed onto the threaded stem 119 of the screw 119, 120, to bring the head 120 of the screw towards the wing 154 of the lower bar 15, compressing the spring 30.

Tightening the nut 121 causes the spring 30 to elastically deform, moving the screen bottom edge attachment device from the configuration shown in the lower portion of FIG. 1, to the configuration shown in the lower portion of FIG. 2.

In the configuration illustrated in FIG. 1, the spring 30 is slightly—or not at all—compressed, so that an upper part of the spring 30, the head 120 of the tie rod 119, 120, and possibly a washer 50 interposed between this head 120 and the spring 30, extend above the upper edge of the wing 155 of the lower holding bar 15 and below the lower edge of the wing 151 of this bar 15.

Consequently, in this configuration, the upper part of the spring 30, the head 120, and possibly the washer 50 are visible to an observer 99 observing the attachment to the building of the lower part of the screen 10 and placed at a distance from the screen 10, for example a few meters or tens of meters from the screen.

In contrast, in the configuration shown in FIG. 2, the spring 30 is sufficiently compressed so that the spring 30, the head 120 of the tie rod 119, 120, and the washer 50 all extend below the upper edge of the wing 155 of the bar 15.

Therefore, in this configuration, the spring 30, head 120, and washer 50 are not visible to an observer 99 observing the attachment to the building of the lower portion of the screen 10 and placed at a distance from the screen 10, since they are masked/hidden by the wing 155 (which is opaque).

The observer can thus visually evaluate that the traction on the screen operated by the tie rods 119, 120 is correct when the spring 30, the tie rod head 120 and the support washer 50 are hidden by the wing 155 of the lower bar 15.

The uncompressed length of the spring 30, the stiffness of this spring, the thickness of the washer 50 and that of the head 120, as well as the height of the mask formed by the wing 155 of the bar 15 are chosen in such a way that the wing 155 masks the spring, the washer and the head when the height of the compressed spring corresponds to a traction in the tie rod 119, 120 that causes adequate tensioning of the screen.

The adequate tension of the screen may be determined (calculated) according to the mechanical characteristics of the metal mesh forming the screen and the evaluation of the forces exerted by the wind on the screen. These forces may be determined in accordance with the standard NF EN 1991-1-4, for example.

For example, the proper average (distributed) tension of the screen may be in the range of one thousand to two thousand Newtons per meter of length of the bottom edge of the screen.

The stiffness of the spring 30 may be selected in a range from about ten thousand newtons per meter (N/m) to about one hundred thousand newtons per meter (N/m), for example.

In this embodiment, the mask 155 forms, together with the head 120 and optionally the spring 30 and/or the washer 50, a visual evaluation—or indicator—of the intensity of the tension exerted on the screen 10 by the tie rod 119, 120.

To facilitate visual assessment of the intensity of the traction exerted, the upper part of the spring 30, the head 120 and/or the washer 50 which is/are movable by translation relative to the mask 155 along the traction axis 22 of the traction element 119, 120, may be colored, in particular in a color visually contrasting with that of the mask 155.

The visual indicator may thus be integrated or linked to the mechanical deformable member 30 (i.e., the spring), and may essentially be comprised of the colored washer 50 on which the mechanical deformable member 30 and the tensioning element 119, 120 are supported.

The screen bottom edge attachment and tensioning device shown in FIGS. 4 and 5 includes a attaching module 70, with a plurality of identical modules 70 being sealed to the building below the screen bottom edge. The modules 70 may be evenly spaced along the screen bottom edge.

Each module 70 comprises a section 17 of an angle bracket fixed to the building 12 by two screws 18 and reinforced by two flat lateral gussets 80 of trapezoidal shape.

The traction element 119, 120 here comprises an eyebolt whose head 120 is in the shape of a thick disk pierced with a central hole of circular section through which extends a weft (horizontal) element (rod or cable) 130 provided along the lower edge of the screen to be fixed to the building.

The device for evaluating the amount of tension exerted on the screen by the tensioning element 119, 120 when the tensioning nut 121 is screwed onto the rod 119, includes a visual (colored) indicator/witness 500 slidably mounted within a mask 1550 along the longitudinal axis 22 of the rod 119; the indicator 500 sinks into the mask 1550 and approaches the horizontal flange 170 of the angle bracket 17 when the nut 121 is screwed onto the rod 119.

The movable visual indicator 500 includes a disk-shaped base wall 502 with a hole through which the rod 119 extends, the wall 502 being inserted/clamped between the nut 121 and the spring 30, and the indicator 500 includes an annular enclosure wall 501 that extends along the axis 22 from the wall 502 and surrounds a lower portion of the spring 30.

Similarly, the mask 1550 has a disk-shaped bottom wall 1551 with a hole through which the rod 119 passes, which bottom wall is inserted/clamped between the horizontal flange 170 of the bracket 17 and the spring 30; the mask 1550 also has an annular envelope wall, which extends along the axis 22 from the wall 1551 and surrounds an upper portion of the spring 30 and the wall 501 of the indicator 500.

The indicator 500 and the mask 1550 form a two-part cylindrical housing surrounding the spring 30.

As in the embodiment of FIGS. 1 and 2, the length of the spring 30, the stiffness of the spring, the height of the colored indicator 500 (measured along the axis 22), and the height of the envelope wall of the mask 1550 may be selected so that the mask 1550 conceals the colored indicator 500 when the height of the compressed spring corresponds to a traction (exerted by the tie rod 119, 120) that causes the screen to be adequately tensioned.

Figure 4:
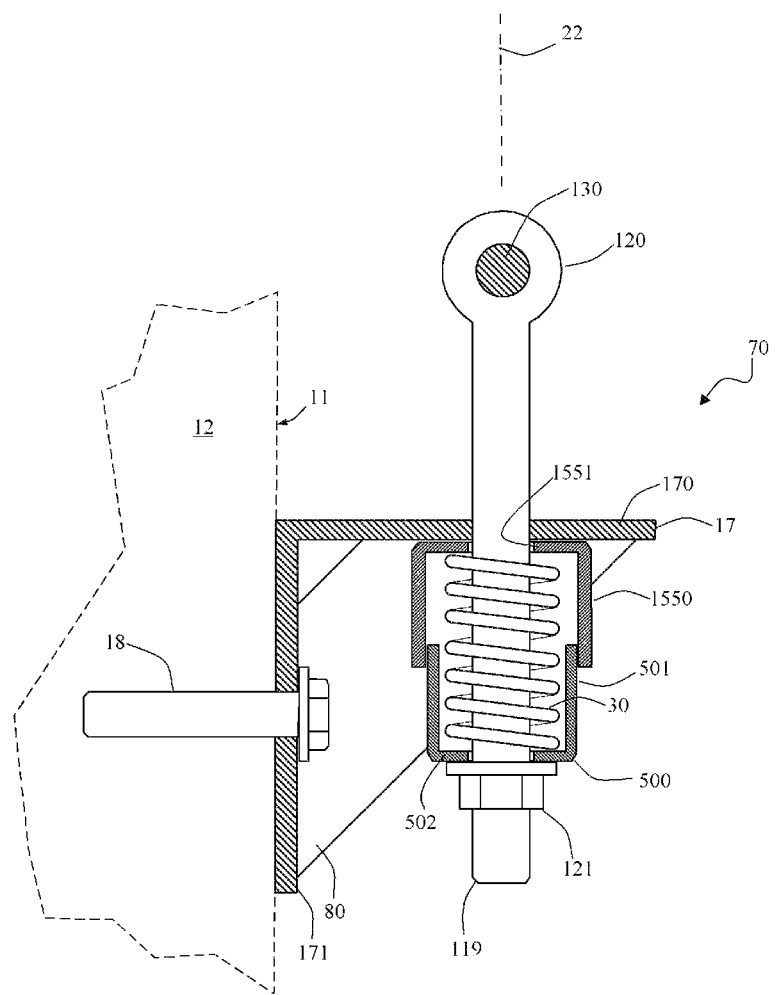
Figure 5:
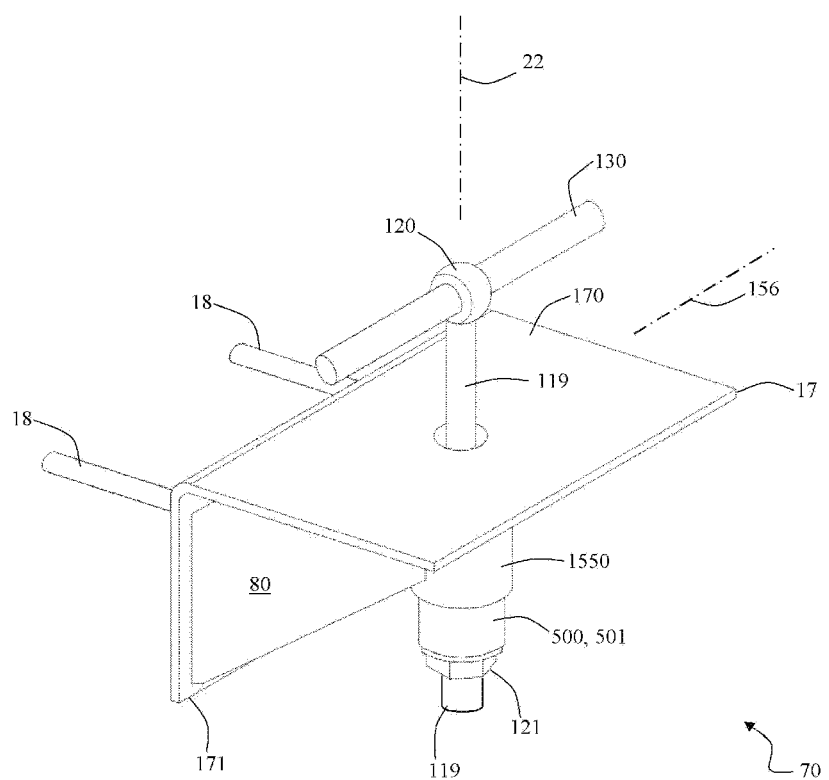
FIG. 5 illustrates a schematic perspective view of the attaching module shown in FIG. 4.

In the configuration shown in FIGS. 4 and 5, the traction exerted by the nut 121 on the tie rod 119, 120 is less than that which ensures adequate tension of the screen, and a portion of the indicator 500 protruding under the mask 1550 is visible to an observer who can thus assess that tension is insufficient.

In the embodiments described above, the mechanical member of the screen tension control device is a coil spring 30 that is subjected to the tensile force exerted by the traction member 121 on the traction member 119, 120. The spring 30 is compression loaded during tensioning, extends around a portion of the traction rod 119, and is supported on the traction head 120 or on the traction nut 121.

The spring 30 contributing to the visual evaluation of the intensity of the traction exerted by the tie rod 119, 120 on the screen may be any type of compression spring whose amplitude of deformation varies according to the intensity of the traction exerted.

The attaching device may have several traction elements and as many traction evaluation elements, arranged along several edges of the screen, in particular along the lower edge of the screen as described above and along the upper edge of the screen as shown in FIGS. 1 and 2.

With reference to FIGS. 1 and 2, the tensioning of the screen along its upper edge may also be achieved by screwing the nut 21 onto the stem 19 of the screw 19, 20, to bring the head 20 of the screw closer to the horizontal flange 160 of the bracket 16.

In an embodiment, the device for evaluating the amount of traction exerted on the stem 19 by the spring may additionally include a force sensor 40 that provides a signal that varies as a function of the amount of traction exerted on the stem 19. To this end, the sensor 40 extends around a portion of the stem 19, is clamped between the head 20 of the traction screw and the wing 154 of the upper holding bar 15, and is compression loaded when the nut 21 is tightened on the stem 19. An electrical signal delivered by the sensor 40 may be converted into a light signal or a radio signal for transmitting, at a distance from the screen, information characteristic of the intensity of the traction exerted on the stem 19 by the nut 21. The sensor 40 may be, for example, a piezoelectric sensor or a strain gauge sensor, and may, for example, be powered by photovoltaic cells integrated or connected to the screen or to the screen attachment device.

The invention claimed is:

1. A method for attaching a metal mesh sunshield screen to a building, the method comprising:
   connecting the screen to the building by at least one traction element connected to at least one edge of the screen,
   tensioning the screen by exerting a traction on the traction element, the traction element comprising a tie rod extending through an opening in a fastening element fixed to the building, the tie rod having, at a proximal end, a head connected to said edge of the screen, and, at a distal end, a tensioning nut screwed onto the tie rod, the traction on the traction element being provided by an elastically deformable compression spring extending around the tie rod and compression loaded between the fastening element fixed to the building and the tensioning nut, along a traction axis on the traction element, and
   evaluating the intensity of the traction exerted on the traction element by means of an evaluation device comprising:
   a first evaluation device element comprising a first bottom wall having a hole through which the tie rod extends, and a first envelope wall extending around the traction axis from the first bottom wall and surrounding a portion of the elastically deformable compression spring, the first bottom wall being clamped between the fastening element fixed to the building and a proximal end of the elastically deformable compression spring, and
   a second evaluation device element comprising a second bottom wall having a hole through which the tie rod extends, and a second envelope wall extending around the traction axis from the second bottom wall and surrounding a portion of the elastically deformable compression spring, the second bottom wall being clamped between the tensioning nut and a distal end of the elastically deformable compression spring,
   wherein said first and second evaluation device elements form a two-part housing surrounding the elastically deformable compression spring such that the envelope wall of one of the first or second evaluation device elements slides inside the envelope wall of the other and is progressively concealed by that envelope wall as the compression exerted on the elastically deformable compression spring by the tensioning nut increases,
   the evaluation device element that is progressively concealed forming a visual indicator, while the evaluation device element that conceals the visual indicator forms an opaque mask.

2. The method of claim 1, wherein the visual indicator comprises a witness or colored part.

3. The method of claim 1, wherein the intensities of the traction on the traction element are monitored remotely from the screen by visual observation of the visual indicator.

4. The method of claim 1, further comprising:
   connecting the screen to the building by a plurality of traction elements spaced along at least one edge of the screen,
   tensioning the screen by exerting traction on each of the traction elements, and
   evaluating the intensities of the traction exerted on each traction element.

5. The method of claim 4, wherein the traction elements are arranged evenly spaced along an edge of the screen, and the traction elements are acted upon with substantially equal traction intensities.

6. The method of claim 1, wherein the second evaluation device element is progressively concealed by the envelope wall of the second evaluation device element as the compression exerted on the elastically deformable compression spring by the tensioning nut increases.

7. The method of claim 1, wherein the first evaluation device element is progressively concealed by the envelope wall of the second evaluation device element as the compression exerted on the elastically deformable compression spring by the tensioning nut increases.

8. The method of claim 1, wherein said first envelope wall and second envelope wall are both substantially cylindrical.

9. A device for attaching a metal mesh screen to a building through a fastening element fixed to the building, the device comprising:
   at least one traction element comprising a tie rod configured to extend through an opening in said fastening element fixed to the building, the tie rod comprising, at a proximal end, a head configured to be connected to at least one edge of the screen, and, at a distal end, a tensioning nut screwed onto the tie rod,
   an elastically deformable compression spring extending around the tie rod and configured to be compression loaded along a traction axis between said fastening element and the tensioning nut, to exert a traction on the tie rod, and
   an evaluation device comprising:
   a first evaluation device element having a first bottom wall with a hole through which the tie rod extends, and a first envelope wall extending around the traction axis from the first bottom wall and surrounding a portion of the compression spring, the first bottom wall being configured to be clamped between said fastening element and a proximal end of the elastically deformable compression spring, and
   a second evaluation device element having a second bottom wall with a hole through which the tie rod extends, and a second envelope wall extending around the traction axis from the second bottom wall and surrounding a portion of the compression spring, the second bottom wall being configured to be clamped between the tensioning nut and a distal portion of the compression spring,
   wherein said first and second evaluation device elements form a two-part housing surrounding the compression spring such that the envelope wall of one of the first or second evaluation device elements, in use, slides inside the envelope wall of the other and is progressively concealed by that envelope wall as the compression exerted on the compression spring by the tensioning nut increases, and
   wherein the evaluation device element that is progressively concealed forms a visual indicator, while the evaluation device element that conceals the visual indicator forms an opaque mask.

10. The device of claim 9, wherein the visual indicator comprises a colored indicator or witness.

11. The device of claim 9, wherein the stiffness of the spring is in a range from about ten thousand newtons per meter (N/m) up to about one hundred thousand newtons per meter (N/m).

12. The device of claim 9, wherein the second evaluation device element is progressively concealed by the envelope wall of the first evaluation device element as the compression exerted on the elastically deformable compression spring by the tensioning nut increases.

13. The device of claim 9, wherein the first evaluation device element is progressively concealed by the envelope wall of the second evaluation device element as the compression exerted on the elastically deformable compression spring by the tensioning nut increases.

14. The device of claim 9, wherein said first envelope wall and second envelope wall are both substantially cylindrical.

\* \* \* \* \*